[11] 3,582,604

[72] Inventors David Grigorievich Bykhovsky
Konjushenny per., 1/6, Kv. 18;
Alexandr Ivanovich Danilov, V.O. 16 linia, 79, Kv. 15; Alexandr Yakovlevich Medvedev, Kalyaeva, 3, Kv. 17; Mikhail Gershenovich Fridlyand, Ganguts Kaya ul., 6, Kv. 9, all of Leningrad, U.S.S.R.
[21] Appl. No. 792,148
[22] Filed Jan. 17, 1969
[45] Patented June 1, 1971

[54] METHOD OF PLASMA TREATMENT OF METALS
5 Claims, No Drawings
[52] U.S. Cl. ................................................ 219/121, 219/75
[51] Int. Cl. ................................................ B23k 9/00
[50] Field of Search ......................................... 219/74--76, 121, 137

[56] References Cited
UNITED STATES PATENTS
2,932,721  4/1960  Kooistra ..................... 219/74
3,149,222  9/1964  Giannini et al. .............. 219/121
3,324,334  6/1967  Reed .......................... 219/121X

*Primary Examiner*—J. V. Truhe
*Assistant Examiner*—C. L. Albritton
*Attorney*—Waters, Roditi, Schwartz & Nissen ABSTRACT: A method is provided for plasma treatment of metals without removing the material from the treatment area (for example, welding, surfaceremelting, surfacing and the like) by a transfer plasma arc burning between the plasmatron electrode and the metal being treated, one of the electrode areas of the arc being located on said metal. The method consists in that the plasma treatment is carried out in a layer of flux and plasma is produced from a gas mixture comprising components having considerably different values of heat conductivity at arc temperatures. The component with the relatively high heat conductivity is hydrogen, helium or nitrogen, and the component with the relatively low heat conductively is neon, argon, xenon, krypton or nitrogen.

METHOD OF PLASMA TREATMENT OF METALS

The present invention relates to methods of treatment of metals and more particularly to methods of plasma treatment of metals in which plasma is produced by gas mixtures. The invention is useful in welding, depositing, removal of casting and forging defects, surface remelting and other similar treatment processes not involving the removal of metal.

Known in the art is a method of plasma treatment of metals where plasma is produced from gas mixtures.

However, the known method can only be used for the plasma treatment of thin metals with a low thermal conductivity and the treatment process is rather inefficient, since the treatment of thick metals with a high thermal conductivity calls for a considerable increase in the plasma-arc current, as well as an increase of the total consumption of gas mixture used for the production of plasma and of the consumption of the high thermal conductivity component of the mixture, and requires a smaller diameter of the passage in the forming nozzle of the plasmotron. In the known method this cannot be achieved because of an increased pressure exerted by the arc on the molten pool, because of splattering of metal, impaired protection of metal against the effect of the ambient medium, all these factors preventing the possibility of producing a high-quality weld. Therefore the known method of plasma treatment of metals is unfit for ensuring a considerable increase in the total and specific heat transfer into the treated metal at the point of contact between this metal and the plasma arc.

It is an object of the present invention to eliminate the aforesaid disadvantages.

The main object of the invention is to provide a method allowing plasma treatment of metals of a large thickness irrespective of their thermal conductivity and ensuring a high productivity of the process.

This object is accomplished by providing a method of plasma treatment of metals with plasma produced from a gas mixture, wherein, according to the invention, the treatment of the metals is accomplished under a layer of flux and one of the components of the gas mixture is constituted by hydrogen, helium or nitrogen, the other components being taken from the series of gases including a group of inert gases and nitrogen.

It is expedient, that plasma treatment of metals be carried out under a layer of flux, and producing plasma from a gas mixture consisting of helium and argon in proportions from 2:1 to 6:1 by volume, or a mixture including hydrogen and argon in proportions from 1:20 to 1:10 by volume, or a mixture including nitrogen and argon in proportions from 1:2 to 3:1 by volume.

The field of application of plasma treatment of metals can be extended by the use of this method owing to the fact, that the use of flux excludes splattering of the molten metal, and its interaction with the ambient medium regardless of the composition and consumption of the gas mixture used for the production of plasma, of the plasma-arc current and the dimensions of the molten pool.

Besides, the use of such a component of the gas mixture as either hydrogen, or helium or nitrogen ensures efficient transfer of heat from the plasma arc to the treated metal, this heat transfer increasing with the consumption of these gases, which is possible only in the presence of flux. The use as the other components of the gas mixture of the gases selected from the series including a group of inert gases and nitrogen protects the plasmotron electrodes from deterioration. The consumption of these gases should increase with an increase of the plasma-arc current and consumption of hydrogen or helium or nitrogen which is also possible only in the presence of flux.

Thus, only a combination of the factors characterizing the present invention gives a possibility of increasing the total and specific transfer of heat to the metal without impairing the forming of the weld and ruining the plasmotron electrodes.

To render the invention more apparent to those skilled in the art, a few examples are submitted below.

Example 1. Plasma-arc Welding of Copper-base Alloys.

Butt welding of articles made of copper-base alloys, wall thickness 40 mm. Single-pass one-sided welding without grooving.

The surface of the metal along the butt joint line is covered with a layer of flux 30 to 40 mm. thick and 100 to 120 mm. wide. The flux is of the grade used for automatic-arc welding of copper-base alloys with fusible electrodes.

The article to be welded and a plasmotron electrode are connected to a power supply. The forming nozzle of the plasmotron is supplied with a gas mixture consisting of helium and argon in a proportion of 5:1 by volume. The plasma arc is ignited between the plasmotron electrode and the article to be welded. The arc current is increased to a value ranging between 1,200 and 1,500 A and determined more accurately in accordance with the size of the articles to be welded. After the formation of the molten pool, a plasmotron is moved along the joint of the article to be welded at a speed which depends on the size of the article and varies from 3 to 6 m./hr.

The flux used for welding is either placed in advance on the surface of the article or is supplied continuously onto this surface in front of the moving plasmotron.

This process produces a weld covered with a slag crust.

Example 2. Plasma-arc Welding of Stainless Chrome-nickel steels.

Butt welding of articles with walls 20 mm. thick. Two-sided single-pass welding without grooving.

The welding procedure is as specified in the first example. The gas mixture intended for the production of plasma contains hydrogen and argon in a proportion of 1:15 by volume. The plasma-arc current varies from 400 to 500 A.

The flux is of the oxygen-free grade usually employed for automatic welding of stainless steel with fusible electrodes under a layer of flux.

Example 3. Plasma-arc Welding of Copper.

Butt welding of articles with walls 15 mm. thick. Two-sided single-pass welding without grooving. The welding procedure is as specified in example 1. The gas mixture used for the production of plasma contains nitrogen and argon in a proportion of 2:1 by volume. Welding current 800 to 900 A. The flux is of the grade used for automatic welding of copper with a fusible electrode under a layer of flux.

The method defined herein provides plasma treatment for the bodies of rotation of a small diameter, excluding or minimizing the preliminary and subsequent machining in welding, and assures the control of the chemical and metallurgical processes in the metal of the weld.

What we claim is:

1. A method of plasma treatment of metals comprising effecting the plasma treatment of the metals in a layer of flux by transferring high-current plasma electric arc from a nozzle electrode to the metal being treated which serves as the other electrode, producing plasma from a gas mixture containing at least two different components having substantially different heat conductivities at arc temperatures, one of said components being selected from the group consisting of hydrogen, helium and nitrogen, and the other component being selected from the group consisting of argon, neon, xenon, krypton and nitrogen, the proportion of the component having the higher heat conductivity ranging from 5 to 85 percent of the mixture volume.

2. A method according to claim 1, wherein the gas mixture is argon and helium, the latter being used in a proportion from 66 to 85 percent of the mixture volume.

3. A method according to claim 1, wherein the gas mixture is hydrogen and argon, hydrogen being used in a proportion from 5 to 10 percent of the mixture volume.

4. A method according to claim 1, wherein the gas mixture is nitrogen and argon, nitrogen being used in a proportion from 33 to 75 percent of the mixture volume.

5. A method as claimed in claim 1, wherein said layer of flux is produced by applying the flux on the metal to cover the same in the region of treatment prior to the transfer of the electric arc to the metal.